US010302457B2

(12) United States Patent
French et al.

(10) Patent No.: US 10,302,457 B2
(45) Date of Patent: May 28, 2019

(54) STRUCTURE AND DESIGN OF AN ANISOTROPIC MAGNETORESISTIVE ANGULAR SENSOR

(71) Applicant: Texas Instruments Incorporated, Dallas, TX (US)

(72) Inventors: William David French, San Jose, CA (US); Dok Won Lee, Mountain View, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 62 days.

(21) Appl. No.: 15/407,990

(22) Filed: Jan. 17, 2017

(65) Prior Publication Data

US 2018/0202837 A1     Jul. 19, 2018

(51) Int. Cl.
    *G01D 5/14*     (2006.01)
(52) U.S. Cl.
    CPC .................... *G01D 5/145* (2013.01)
(58) Field of Classification Search
    CPC ...................................................... G01D 5/16
    See application file for complete search history.

(56) References Cited

U.S. PATENT DOCUMENTS

| 2008/0316654 | A1* | 12/2008 | Aiso | ............... | B82Y 25/00 |
| | | | | | 360/324 |
| 2017/0074947 | A1* | 3/2017 | Mori | ............... | G01R 33/09 |
| 2017/0089940 | A1* | 3/2017 | Bussan | ............... | G01P 3/44 |

\* cited by examiner

*Primary Examiner* — Jermele M Hollington
*Assistant Examiner* — Feba Pothen
(74) *Attorney, Agent, or Firm* — Andrew R. Ralston; Charles A. Brill; Frank D. Cimino

(57) ABSTRACT

An integrated AMR angular sensor includes a first sensor resistor and a second sensor resistor. The first sensor resistor and the second sensor resistor each has a plurality of magnetoresistive segments containing magnetoresistive material that are electrically coupled in series. The magnetoresistive segments of each sensor resistor are parallel/antiparallel to each other. The magnetoresistive segments of the second sensor resistor are perpendicular to the magnetoresistive segments of the first sensor resistor. The first magnetoresistive segments are divided into a first group and a second group, which are disposed in a balanced distribution relative to a sensor central point of the integrated AMR angular sensor. Similarly, the second magnetoresistive segments are divided into a first group and a second group, which are disposed in a balanced distribution relative to the sensor central point.

19 Claims, 4 Drawing Sheets

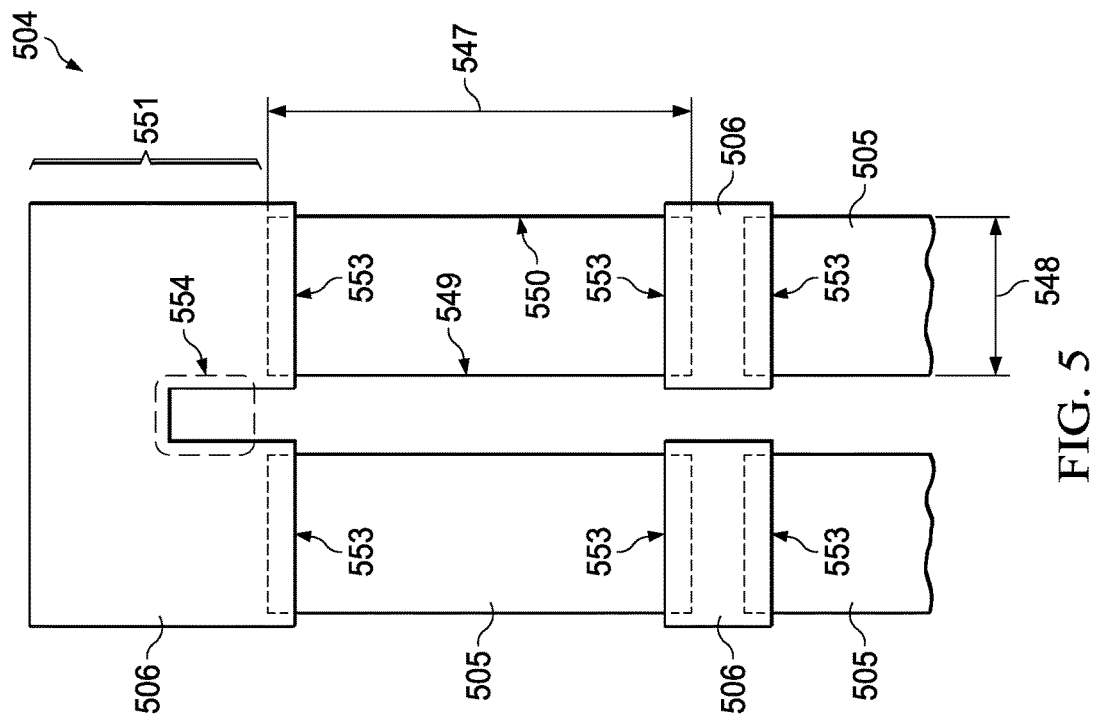
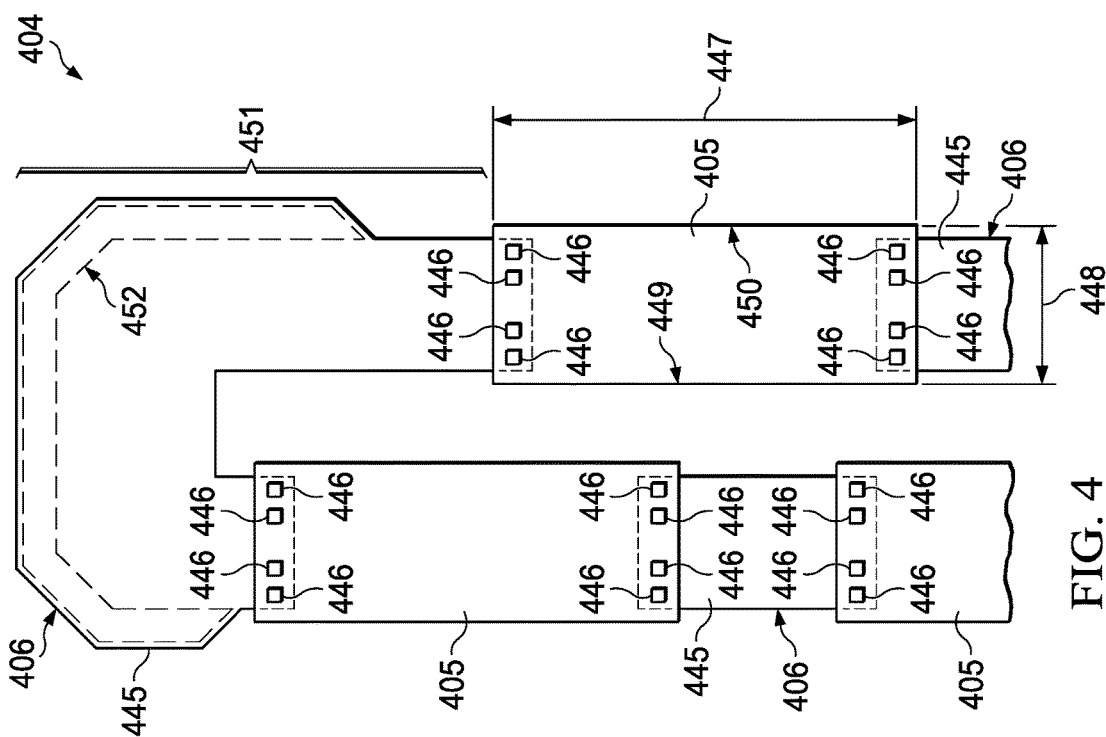

STRUCTURE AND DESIGN OF AN ANISOTROPIC MAGNETORESISTIVE ANGULAR SENSOR

FIELD

This disclosure relates to the field of integrated anisotropic magnetoresistive angular sensors. More particularly, this disclosure relates to the field of integrated anisotropic magnetoresistive angular sensors with resistors of magnetic material.

BACKGROUND

An integrated anisotropic magnetoresistive (AMR) angular sensor is used to measure the orientation of a magnetic field. The integrated AMR angular sensor has a plurality of magnetoresistive segments. Each magnetoresistive segment has an ohmic resistance dependent on the orientation of the magnetic field relative to current flow through the magnetoresistive segment. The integrated AMR angular sensor commonly has several resistors arranged in different orientations, for example eight resistors in two Wheatstone bridges, with one Wheatstone bridge being oriented at 45 degrees with respect to the other. Each resistor includes a plurality of magnetoresistive segments, electrically coupled in series. Differences between the ohmic resistances of the resistors are used to estimate the orientation, sometimes referred to as the angle, of an external magnetic field. The magnetoresistive segments may have low length-to-width ratios, to reduce error due to shape anisotropy in the ohmic resistances of the magnetoresistive segments. A sensing area of the integrated AMR angular sensor extends over the area occupied by the magnetoresistive segments. Having a plurality of magnetoresistive segments in each resistor increases the sensing area, which leads to errors when measuring non-uniform magnetic fields. Magnetoresistive segments in different parts of the sensing area respond to variations in the non-uniform magnetic fields, causing error when estimating the angle of the magnetic field.

SUMMARY

The following presents a simplified summary in order to provide a basic understanding of one or more aspects of the disclosure. This summary is not an extensive overview of the disclosure, and is neither intended to identify key or critical elements of the disclosure, nor to delineate the scope thereof. Rather, the primary purpose of the summary is to present some concepts of the disclosure in a simplified form as a prelude to a more detailed description that is presented later.

An integrated AMR angular sensor includes a first sensor resistor and a second sensor resistor. The first sensor resistor has a plurality of first magnetoresistive segments that are electrically coupled in series. Each of the first magnetoresistive segments includes magnetoresistive material, with a first electrical contact to the magnetoresistive material at a first end of the first magnetoresistive segment, and a second electrical contact to the magnetoresistive material at a second end of the first magnetoresistive segment, located opposite from the first end. Each first magnetoresistive segment has a length, understood as a lateral dimension of the first magnetoresistive segment parallel to a direction of current flow in the first magnetoresistive segment during operation of the integrated AMR angular sensor, and a width, understood as a lateral dimension of the first magnetoresistive segment perpendicular to the length. The first magnetoresistive segments are oriented so that the lengths of the first magnetoresistive segments are parallel/anti-parallel to each other.

The second sensor resistor has a plurality of second magnetoresistive segments that are electrically coupled in series. Each of the second magnetoresistive segments includes magnetoresistive material, with a first electrical contact to the magnetoresistive material at a first end of the second magnetoresistive segment, and a second electrical contact to the magnetoresistive material at a second end of the second magnetoresistive segment, located opposite from the first end. Each second magnetoresistive segment has a length, and a width, as described for the first magnetoresistive segments. The second magnetoresistive segments are oriented so that the lengths of the second magnetoresistive segments are parallel/anti-parallel to each other and perpendicular to the lengths of the first magnetoresistive segments.

The first magnetoresistive segments are divided into a first group and a second group, which are disposed on opposite sides of a sensor central point of the integrated AMR angular sensor, the first group and the second group having approximately equal numbers of the first magnetoresistive segments. Similarly, the second magnetoresistive segments are divided into a third group and a fourth group, which are disposed on opposite sides of the sensor central point of the integrated AMR angular sensor, the third group and the fourth group having approximately equal numbers of the second magnetoresistive segments.

DESCRIPTION OF THE VIEWS OF THE DRAWING

FIG. 4 is a top view of a portion of an example sensor resistor.

FIG. 5 is a top view of a portion of another example sensor resistor.

DETAILED DESCRIPTION

Figure 1:
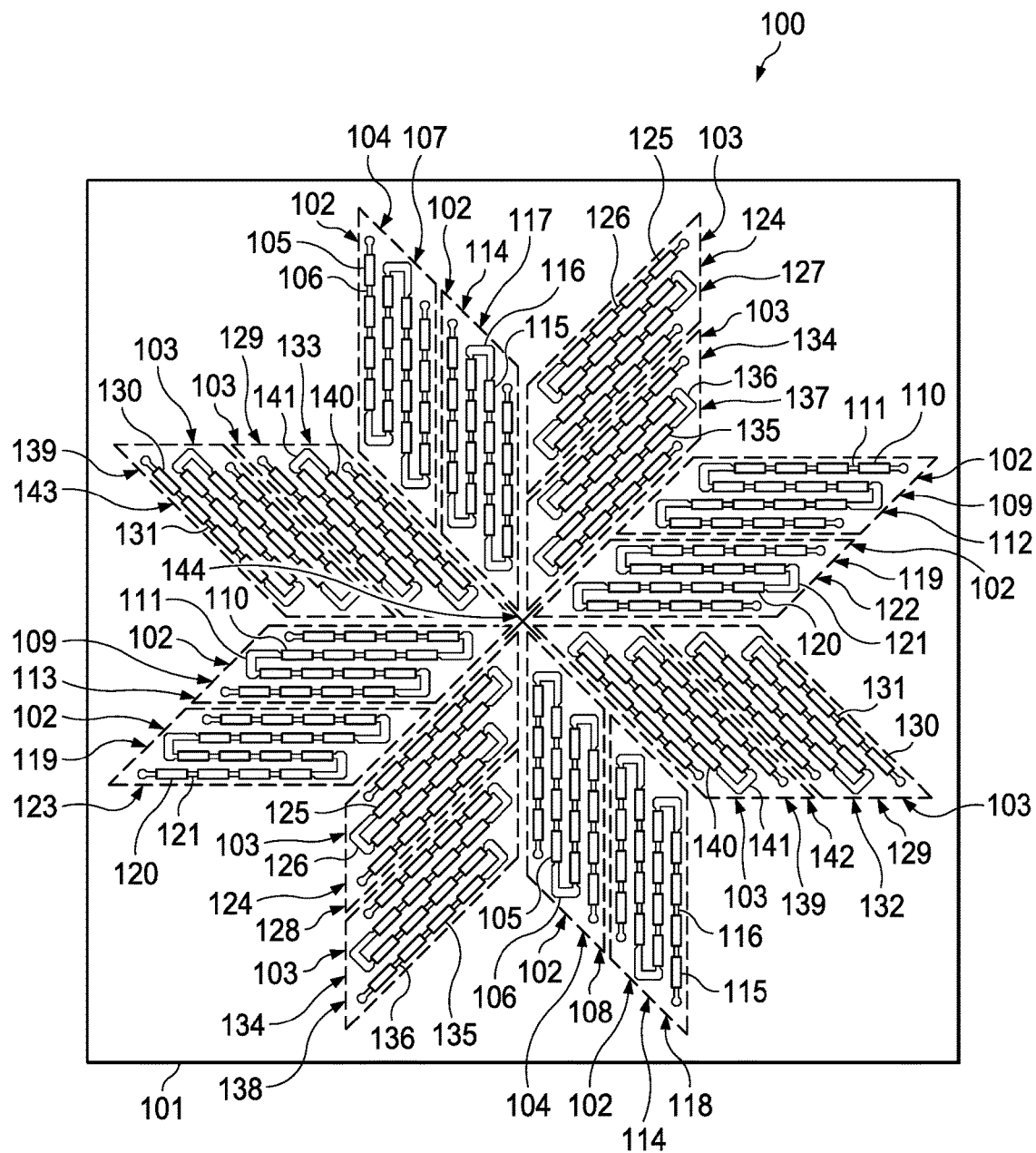
FIG. 1 is a top view of an example integrated AMR angular sensor.

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. One skilled in the relevant art, however, will readily recognize that the disclosure can be practiced without one or more of the specific details or with other methods. In other instances, well-known structures or operations are not shown in detail to avoid obscuring the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

An integrated AMR angular sensor includes a first sensor resistor and a second sensor resistor. The first sensor resistor has a plurality of first magnetoresistive segments that are electrically coupled in series, for example by metal links.

The second sensor resistor has a plurality of second magnetoresistive segments that are also electrically coupled in series. Each first magnetoresistive segment and second magnetoresistive segment includes magnetoresistive material, such as an alloy including iron and nickel. Each first magnetoresistive segment and second magnetoresistive segment has a first electrical contact to the magnetoresistive material at a first end of the first magnetoresistive segment or second magnetoresistive segment, and a second electrical contact to the magnetoresistive material at a second end of the first magnetoresistive segment or second magnetoresistive segment, located opposite from the first end. The first magnetoresistive segments are electrically coupled in series through the first electrical contacts and the second electrical contacts, and similarly for the second magnetoresistive segments.

Each first magnetoresistive segment and each second magnetoresistive segment has a length, understood as a distance between the first electrical contact and the second electrical contact to the first magnetoresistive segment. The length is parallel to a direction of electrical current when the integrated AMR angular sensor is in operation. Each first magnetoresistive segment and each second magnetoresistive segment has a width, understood as a lateral dimension of the first magnetoresistive segment or second magnetoresistive segment, perpendicular to the length. A thickness of each first magnetoresistive segment and each second magnetoresistive segment, that is a dimension of each first magnetoresistive segment and each second magnetoresistive segment in a vertical direction, is significantly less than the width. For each first magnetoresistive segment and each second magnetoresistive segment, a ratio of the length to the width is greater than 3 and less than 10. Having the ratio of the length to the width less than 3 undesirably increases the area required for the first sensor resistor and a second sensor resistor without providing a compensating improvement in measurement accuracy. Having the ratio of the length to the width greater than 10 introduces shape anisotropy errors which unacceptably degrade the measurement accuracy. Having the ratio of the length to the width greater than 3 and less than 10 thus provides a desired balance between sensor area and measurement accuracy. The first magnetoresistive segments are oriented so that the lengths of the first magnetoresistive segments are parallel/anti-parallel to each other. The second magnetoresistive segments are oriented so that the lengths of the second magnetoresistive segments are parallel/anti-parallel to each other and perpendicular to the lengths of the first magnetoresistive segments.

The first magnetoresistive segments are divided into a first group and a second group, which are disposed on opposite sides of a sensor central point of the integrated AMR angular sensor, the first group and the second group having approximately equal numbers of the first magnetoresistive segments. Similarly, the second magnetoresistive segments are divided into a third group and a fourth group, which are disposed on opposite sides of the sensor central point of the integrated AMR angular sensor, the third group and the fourth group having approximately equal numbers of the second magnetoresistive segments. The term "approximately" as applied to numbers of magnetoresistive segments is understood to be within 5 percent. In some cases, the first group and the second group may have exactly equal numbers of the first magnetoresistive segments, and the third group and a fourth group may have exactly equal numbers of the second magnetoresistive segments.

The lengths and length-to-width ratios of all the first magnetoresistive segments and the second magnetoresistive segments may be substantially equal. Alternatively, the lengths and length-to-width ratios may be varied, for example to achieve a desired layout density.

The integrated AMR angular sensor may include eight sensor resistors configured in two Wheatstone bridges; a ratio of output voltages of the two Wheatstone bridges may provide a signal corresponding to a trigonometric function of an orientation of an external magnetic field in a plane of the sensor resistors. Each of the eight sensor resistors may include series of magnetoresistive segments, as described above for the first sensor resistor and the second sensor resistor.

For the purposes of this disclosure, the term "instant top surface" of an integrated AMR angular sensor is understood to refer to a top surface of the integrated AMR angular sensor which exists at the particular step being disclosed. The instant top surface may change from step to step in the formation of the integrated AMR angular sensor.

For the purposes of this disclosure, the term "lateral" is understood to refer to a direction parallel to a plane of the instant top surface of the integrated AMR angular sensor, and the term "vertical" is understood to refer to a direction perpendicular to the plane of the instant top surface of the integrated AMR angular sensor.

For the purposes of this disclosure, in context of line segments with directions, the term "parallel" is understood to refer to line segments that extend in a same direction, and the term "anti-parallel" is understood to refer to line segments with directions that extend in opposite directions. The term "parallel/anti-parallel" is understood to encompass both parallel and anti-parallel orientations.

It is noted that terms such as top, bottom, front, back, over, above, under, and below may be used in this disclosure. These terms should not be construed as limiting the position or orientation of a structure or element, but should be used to provide spatial relationship between structures or elements.

FIG. 1 is a top view of an example integrated AMR angular sensor. The integrated AMR angular sensor 100 includes a substrate 101, which may include a base such as ceramic or silicon, and may include layers of dielectric material over the base. The substrate 101 may include interconnects, vias and such. The substrate 101 may include active components such as transistors.

In the instant example, the integrated AMR angular sensor 100 includes a first Wheatstone bridge 102 and a second Wheatstone bridge 103. The first Wheatstone bridge 102 is distributed on the substrate 101; key elements of the first Wheatstone bridge 102 are depicted in FIG. 1. Similarly, the second Wheatstone bridge 103 is distributed on the substrate 101; key elements of the second Wheatstone bridge 103 are depicted in FIG. 1.

The first Wheatstone bridge 102 includes a first sensor resistor 104, which includes a plurality of first magnetoresistive segments 105 electrically coupled in series by first links 106. The first magnetoresistive segments 105 include magnetic material, for example, manifested as a thin film of nickel iron alloy. The first magnetoresistive segments 105 and the first links 106 are configured so that, during operation of the integrated AMR angular sensor 100, electrical currents through each of the first magnetoresistive segments 105 are substantially parallel/anti-parallel to each other. The first magnetoresistive segments 105 are divided into a first group 107 and a second group 108. The first group 107 and the second group 108 contain approximately equal numbers of the first magnetoresistive segments 105. In the instant example, the first group 107 and the second group 108 are disposed opposite from each other with respect to a sensor central point 144 of the integrated AMR angular sensor 100.

The first Wheatstone bridge 102 includes a second sensor resistor 109, which includes a plurality of second magnetoresistive segments 110 electrically coupled in series by second links 111. The second magnetoresistive segments 110 include magnetoresistive material, and may have a composition and structure similar to the first magnetoresistive segments 105. The second magnetoresistive segments 110 and the second links 111 are configured so that, during operation of the integrated AMR angular sensor 100, electrical currents through each of the second magnetoresistive segments 110 are substantially parallel/anti-parallel to each other, and are substantially perpendicular to the electrical currents through each of the first magnetoresistive segments 105. The second magnetoresistive segments 110 are divided into a third group 112 and a fourth group 113, each with approximately equal numbers of the second magnetoresistive segments 110. In the instant example, the third group 112 and the fourth group 113 are disposed opposite from each other with respect to the sensor central point 144 of the integrated AMR angular sensor 100.

The first Wheatstone bridge 102 includes a third sensor resistor 114, which includes a plurality of third magnetoresistive segments 115 electrically coupled in series by third links 116. The third magnetoresistive segments 115 include magnetoresistive material, and may have a composition and structure similar to the first magnetoresistive segments 105. The third magnetoresistive segments 115 and the third links 116 are configured so that, during operation of the integrated AMR angular sensor 100, electrical currents through each of the third magnetoresistive segments 115 are substantially parallel/anti-parallel to each other, and are substantially parallel/anti-parallel to the electrical currents through each of the first magnetoresistive segments 105. The third magnetoresistive segments 115 are divided, approximately equally, into a fifth group 117 and a sixth group 118. In the instant example, the fifth group 117 and the sixth group 118 are disposed opposite from each other with respect to the sensor central point 144 of the integrated AMR angular sensor 100.

The first Wheatstone bridge 102 includes a fourth sensor resistor 119, which includes a plurality of fourth magnetoresistive segments 120 electrically coupled in series by fourth links 121. The fourth magnetoresistive segments 120 include magnetoresistive material, and may have a composition and structure similar to the first magnetoresistive segments 105. The fourth magnetoresistive segments 120 and the fourth links 121 are configured so that, during operation of the integrated AMR angular sensor 100, electrical currents through each of the fourth magnetoresistive segments 120 are substantially parallel/anti-parallel to each other, and are substantially perpendicular to the electrical currents through each of the first magnetoresistive segments 105. The fourth magnetoresistive segments 120 are divided, approximately equally, into a seventh group 122 and an eighth group 123. In the instant example, the seventh group 122 and the eighth group 123 are disposed opposite from each other with respect to the sensor central point 144 of the integrated AMR angular sensor 100.

The second Wheatstone bridge 103 includes a fifth sensor resistor 124, which includes a plurality of fifth magnetoresistive segments 125 electrically coupled in series by fifth links 126. The fifth magnetoresistive segments 125 have a structure and composition similar to the first magnetoresistive segments 105. The fifth magnetoresistive segments 125 and the fifth links 126 are configured so that, during operation of the integrated AMR angular sensor 100, electrical currents through each of the fifth magnetoresistive segments 125 are substantially parallel/anti-parallel to each other, and are oriented substantially at a 45 degree angle to the electrical currents through each of the first magnetoresistive segments 105. The fifth magnetoresistive segments 125 are divided, approximately equally, into a ninth group 127 and a tenth group 128. In the instant example, the ninth group 127 and the tenth group 128 are disposed opposite from each other with respect to the sensor central point 144 of the integrated AMR angular sensor 100.

The second Wheatstone bridge 103 includes a sixth sensor resistor 129, which includes a plurality of sixth magnetoresistive segments 130 electrically coupled in series by sixth links 131. The sixth magnetoresistive segments 130 have a structure and composition similar to the first magnetoresistive segments 105. The sixth magnetoresistive segments 130 and the sixth links 131 are configured so that, during operation of the integrated AMR angular sensor 100, electrical currents through each of the sixth magnetoresistive segments 130 are substantially parallel/anti-parallel to each other, are substantially perpendicular to the electrical currents through each of the fifth magnetoresistive segments 125, and are oriented substantially at a 45 degree angle to the electrical currents through each of the first magnetoresistive segments 105. The sixth magnetoresistive segments 130 are divided, approximately equally, into an eleventh group 132 and a twelfth group 133. In the instant example, the eleventh group 132 and the twelfth group 133 are disposed opposite from each other with respect to the sensor central point 144 of the integrated AMR angular sensor 100.

The second Wheatstone bridge 103 includes a seventh sensor resistor 134, which includes a plurality of seventh magnetoresistive segments 135 electrically coupled in series by seventh links 136. The seventh magnetoresistive segments 135 have a structure and composition similar to the first magnetoresistive segments 105. The seventh magnetoresistive segments 135 and the seventh links 136 are configured so that, during operation of the integrated AMR angular sensor 100, electrical currents through each of the seventh magnetoresistive segments 135 are substantially parallel/anti-parallel to each other, are substantially parallel/anti-parallel to the electrical currents through each of the fifth magnetoresistive segments 125, and are oriented substantially at a 45 degree angle to the electrical currents through each of the first magnetoresistive segments 105. The seventh magnetoresistive segments 135 are divided, approximately equally, into a thirteenth group 137 and a fourteenth group 138. In the instant example, the thirteenth group 137 and the fourteenth group 138 are disposed opposite from each other with respect to the sensor central point 144 of the integrated AMR angular sensor 100.

The second Wheatstone bridge 103 includes an eighth sensor resistor 139, which includes a plurality of eighth magnetoresistive segments 140 electrically coupled in series by eighth links 141. The eighth magnetoresistive segments 140 have a structure and composition similar to the first magnetoresistive segments 105. The eighth magnetoresistive segments 140 and the eighth links 141 are configured so that, during operation of the integrated AMR angular sensor 100, electrical currents through each of the eighth magnetoresistive segments 140 are substantially parallel/anti-parallel to each other, are substantially perpendicular to the electrical currents through each of the fifth magnetoresistive segments 125, and are oriented substantially at a 45 degree angle to the electrical currents through each of the first magnetoresistive segments 105. The eighth magnetoresistive segments 140 are divided, approximately equally, into a fifteenth group 142 and a sixteenth group 143. In the instant example, the fifteenth group 142 and the sixteenth group 143 are disposed opposite from each other with respect to the sensor central point 144 of the integrated AMR angular sensor 100.

A geometric center of the first magnetoresistive segments 105 is a location in a plane containing the first magnetoresistive segments 105; the geometric center of the first magnetoresistive segments 105 may be understood as an arithmetic average position of all of the first magnetoresistive segments 105. Rectilinear coordinates, commonly referred to as "x and y coordinates," are frequently assigned to locations of the first magnetoresistive segments 105, for example during a design phase for the integrated AMR angular sensor 100. An x coordinate of the geometric center of the first magnetoresistive segments 105 may be computed as an arithmetic average of the x coordinates of all the first magnetoresistive segments 105. Similarly, a y coordinate of the geometric center of the first magnetoresistive segments 105 may be computed as an arithmetic average of the y coordinates of all the first magnetoresistive segments 105. Locations for geometric centers of the second magnetoresistive segments 110, the third magnetoresistive segments 115, the fourth magnetoresistive segments 120, the fifth magnetoresistive segments 125, the sixth magnetoresistive segments 130, the seventh magnetoresistive segments 135, and the eighth magnetoresistive segments 140 may be computed in a similar manner. The geometric centers of the first magnetoresistive segments 105, the second magnetoresistive segments 110, the third magnetoresistive segments 115, the fourth magnetoresistive segments 120, the fifth magnetoresistive segments 125, the sixth magnetoresistive segments 130, the seventh magnetoresistive segments 135, and the eighth magnetoresistive segments 140 may be proximate to each other, which may advantageously provide more accurate measurements of angles of non-uniform magnetic fields, by providing estimates of the average magnetic field relative to a region containing the geometric centers. This advantage is conferred because the magnetoresistive segments 105, 110, 115, 120, 125, 130, 135, and 140 of each sensor resistor 104, 109, 114, 119, 124, 129, 134, and 139 have a balanced distribution relative to the sensor central point 144 of the integrated AMR angular sensor 100. This advantage may be enhanced by having equal numbers of the first magnetoresistive segments 105 in the first group 107 and the second group 108, having equal numbers of the second magnetoresistive segments 110 in the third group 112 and the fourth group 113, and so on, for all eight pluralities of the magnetoresistive segments 105, 110, 115, 120, 125, 130, 135, and 140.

Figure 2:
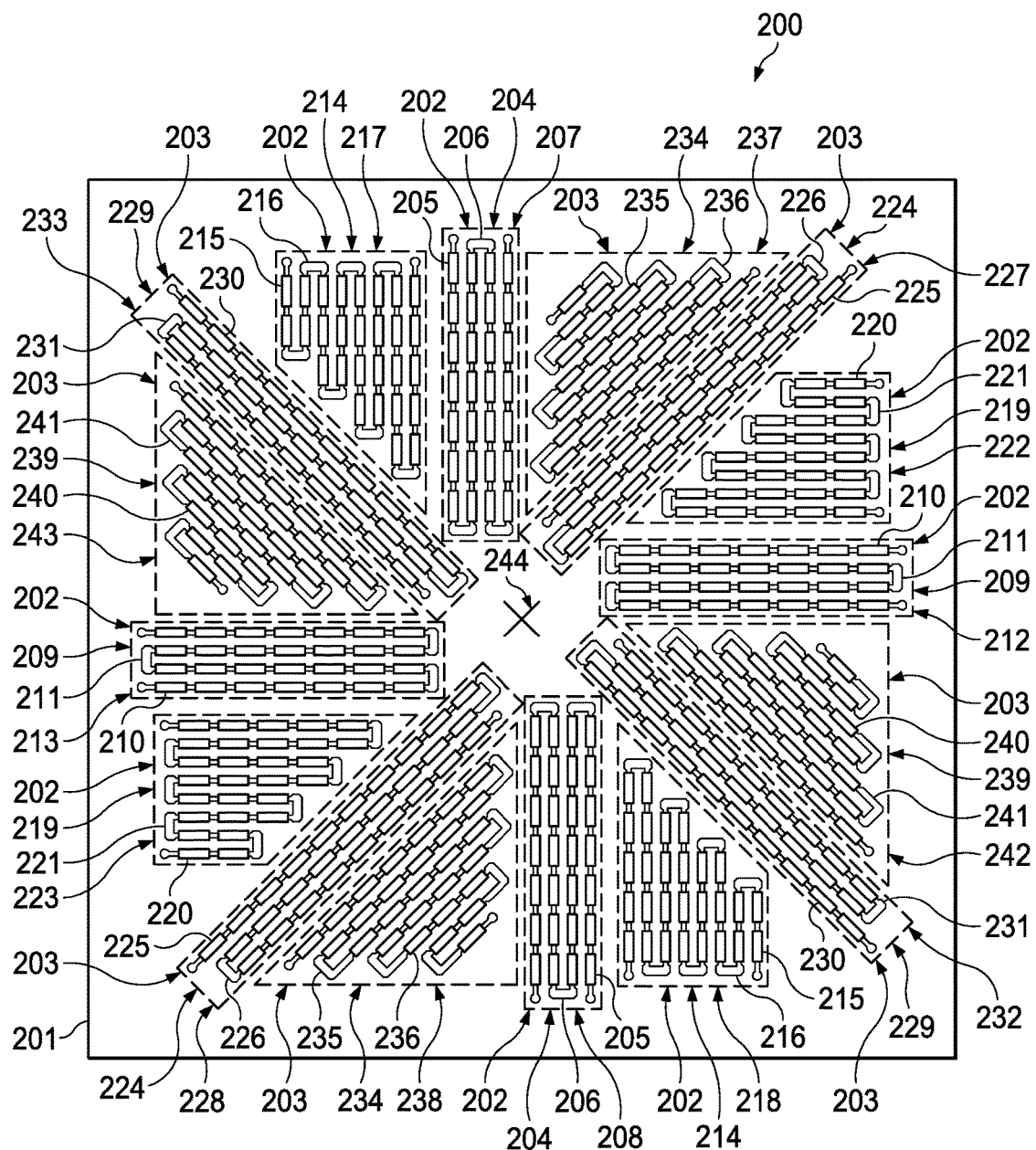
FIG. 2 is a top view of another example integrated AMR angular sensor.

FIG. 2 is a top view of another example integrated AMR angular sensor. The integrated AMR angular sensor 200 includes a substrate 201, which may include a base such as ceramic or silicon, and may include layers of dielectric material over the base. The substrate 201 may be, for example, an integrated circuit, with active components such as transistors. In the instant example, the integrated AMR angular sensor 200 includes a first Wheatstone bridge 202 and a second Wheatstone bridge 203. The first Wheatstone bridge 202 and the second Wheatstone bridge 203 are distributed on the substrate 201. Key elements of the Wheatstone bridges 202 and 203 are depicted in FIG. 2.

The first Wheatstone bridge 202 includes a first sensor resistor 204, a second sensor resistor 209, a third sensor resistor 214, and a fourth sensor resistor 219. The second Wheatstone bridge 203 includes a fifth sensor resistor 224, a sixth sensor resistor 229, a seventh sensor resistor 234, and an eighth sensor resistor 239.

The first sensor resistor 204 includes a plurality of first magnetoresistive segments 205 electrically coupled in series by first links 206. The first magnetoresistive segments 205 are divided, approximately equally, into a first group 207 and a second group 208. The first group 207 and the second group 208 may contain equal numbers of the first magnetoresistive segments 205. A geometric center of the first magnetoresistive segments 205 is located approximately at a sensor central point 244 in a central region of the first Wheatstone bridge 202 and the second Wheatstone bridge 203, denoted in FIG. 2 by the symbol x. In the context of the instant example, the term "approximately" may be understood to reflect design tolerances and variations incurred during formation of the integrated AMR angular sensor 200. The first group 207 and the second group 208 of the first magnetoresistive segments 205 are disposed on opposite sides of the sensor central point 244. The first magnetoresistive segments 205 and the first links 206 are configured so that, during operation of the integrated AMR angular sensor 200, electrical currents through each of the first magnetoresistive segments 205 are substantially parallel/anti-parallel to each other.

The second sensor resistor 209 includes a plurality of second magnetoresistive segments 210 electrically coupled in series by second links 211. The second magnetoresistive segments 210 are divided, approximately equally, into a third group 212 and a fourth group 213. A geometric center of the second magnetoresistive segments 210 is located approximately at the sensor central point 244. The third group 212 and the fourth group 213 of the second magnetoresistive segments 210 are disposed on opposite sides of the sensor central point 244. The second magnetoresistive segments 210 and the second links 211 are configured so that, during operation of the integrated AMR angular sensor 200, electrical currents through each of the second magnetoresistive segments 210 are substantially parallel/anti-parallel to each other, and are substantially perpendicular to the electrical currents through the first magnetoresistive segments 205.

The third sensor resistor 214 includes a plurality of third magnetoresistive segments 215 electrically coupled in series by third links 216. The third magnetoresistive segments 215 are divided, approximately equally, into a fifth group 217 and a sixth group 218. A geometric center of the third magnetoresistive segments 215 is located approximately at the sensor central point 244. The fifth group 217 and the sixth group 218 of the third magnetoresistive segments 215 are disposed on opposite sides of the sensor central point 244. The third magnetoresistive segments 215 and the third links 216 are configured so that, during operation of the integrated AMR angular sensor 200, electrical currents through each of the third magnetoresistive segments 215 are substantially parallel/anti-parallel to each other, and are substantially parallel/anti-parallel to the electrical currents through the first magnetoresistive segments 205.

The fourth sensor resistor 219 includes a plurality of fourth magnetoresistive segments 220 electrically coupled in series by fourth links 221. The fourth magnetoresistive segments 220 are divided, approximately equally, into a seventh group 222 and an eighth group 223. A geometric center of the fourth magnetoresistive segments 220 is located approximately at the sensor central point 244. The seventh group 222 and the eighth group 223 of the fourth magnetoresistive segments 220 are disposed on opposite sides of the sensor central point 244. The fourth magnetoresistive segments 220 and the fourth links 221 are configured so that, during operation of the integrated AMR angular sensor 200, electrical currents through each of the fourth magnetoresistive segments 220 are substantially parallel/anti-parallel to each other, and are substantially perpendicular to the electrical currents through the first magnetoresistive segments 205.

The fifth sensor resistor 224 includes a plurality of fifth magnetoresistive segments 225 electrically coupled in series by fifth links 226. The fifth magnetoresistive segments 225 are divided, approximately equally, into a ninth group 227 and a tenth group 228. A geometric center of the fifth magnetoresistive segments 225 is located approximately at the sensor central point 244. The ninth group 227 and the tenth group 228 of the fifth magnetoresistive segments 225 are disposed on opposite sides of the sensor central point 244. The fifth magnetoresistive segments 225 and the fifth links 226 are configured so that, during operation of the integrated AMR angular sensor 200, electrical currents through each of the fifth magnetoresistive segments 225 are substantially parallel/anti-parallel to each other, and are at approximately a 45 degree angle to the electrical currents through the first magnetoresistive segments 205.

The sixth sensor resistor 229 includes a plurality of sixth magnetoresistive segments 230 electrically coupled in series by sixth links 231. The sixth magnetoresistive segments 230 are divided, approximately equally, into an eleventh group 232 and a twelfth group 233. A geometric center of the sixth magnetoresistive segments 230 is located approximately at the sensor central point 244. The eleventh group 232 and the twelfth group 233 of the sixth magnetoresistive segments 230 are disposed on opposite sides of the sensor central point 244. The sixth magnetoresistive segments 230 and the sixth links 231 are configured so that, during operation of the integrated AMR angular sensor 200, electrical currents through each of the sixth magnetoresistive segments 230 are substantially parallel/anti-parallel to each other, are substantially perpendicular to the electrical currents through the fifth magnetoresistive segments 225, and are at approximately a 45 degree angle to the electrical currents through the first magnetoresistive segments 205.

The seventh sensor resistor 234 includes a plurality of seventh magnetoresistive segments 235 electrically coupled in series by seventh links 236. The seventh magnetoresistive segments 235 are divided, approximately equally, into a thirteenth group 237 and a fourteenth group 238. A geometric center of the seventh magnetoresistive segments 235 is located approximately at the sensor central point 244. The thirteenth group 237 and the fourteenth group 238 of the seventh magnetoresistive segments 235 are disposed on opposite sides of the sensor central point 244. The seventh magnetoresistive segments 235 and the seventh links 236 are configured so that, during operation of the integrated AMR angular sensor 200, electrical currents through each of the seventh magnetoresistive segments 235 are substantially parallel/anti-parallel to each other, are substantially parallel/anti-parallel to the electrical currents through the fifth magnetoresistive segments 225, and are at approximately a 45 degree angle to the electrical currents through the first magnetoresistive segments 205.

The eighth sensor resistor 239 includes a plurality of eighth magnetoresistive segments 240 electrically coupled in series by eighth links 241. The eighth magnetoresistive segments 240 are divided, approximately equally, into a fifteenth group 242 and a sixteenth group 243. A geometric center of the eighth magnetoresistive segments 240 is located approximately at the sensor central point 244. The fifteenth group 242 and the sixteenth group 243 of the eighth magnetoresistive segments 240 are disposed on opposite sides of the sensor central point 244. The eighth magnetoresistive segments 240 and the eighth links 241 are configured so that, during operation of the integrated AMR angular sensor 200, electrical currents through each of the eighth magnetoresistive segments 240 are substantially parallel/anti-parallel to each other, are substantially perpendicular to the electrical currents through the fifth magnetoresistive segments 225, and are at approximately a 45 degree angle to the electrical currents through the first magnetoresistive segments 205.

Arranging the magnetoresistive segments 205, 210, 215, 220, 225, 230, 235, and 240 to have the geometric centers at approximately the sensor central point 244 may advantageously provide more accurate measurements of angles of non-uniform magnetic fields, by providing estimates of the average magnetic field that more accurately estimate the magnetic field at the sensor central point 244. This advantage is conferred because the magnetoresistive segments 205, 210, 215, 220, 225, 230, 235, and 240 of each sensor resistor 204, 209, 214, 219, 224, 229, 234, and 239 have a balanced distribution relative to the sensor central point 244. This advantage may be enhanced by having equal numbers of the first magnetoresistive segments 205 in the first group 207 and the second group 208, having equal numbers of the second magnetoresistive segments 210 in the third group 212 and the fourth group 213, and so on, for all eight pluralities of the magnetoresistive segments 205, 210, 215, 220, 225, 230, 235, and 240. In the instant example, the magnetoresistive segments 205, 210, 215, 220, 225, 230, 235, and 240 may occupy an area having a square shape, as shown in FIG. 2, which may reduce an area of the integrated AMR angular sensor 200, and hence advantageously reduce a fabrication cost of the integrated AMR angular sensor 200.

Figure 3:
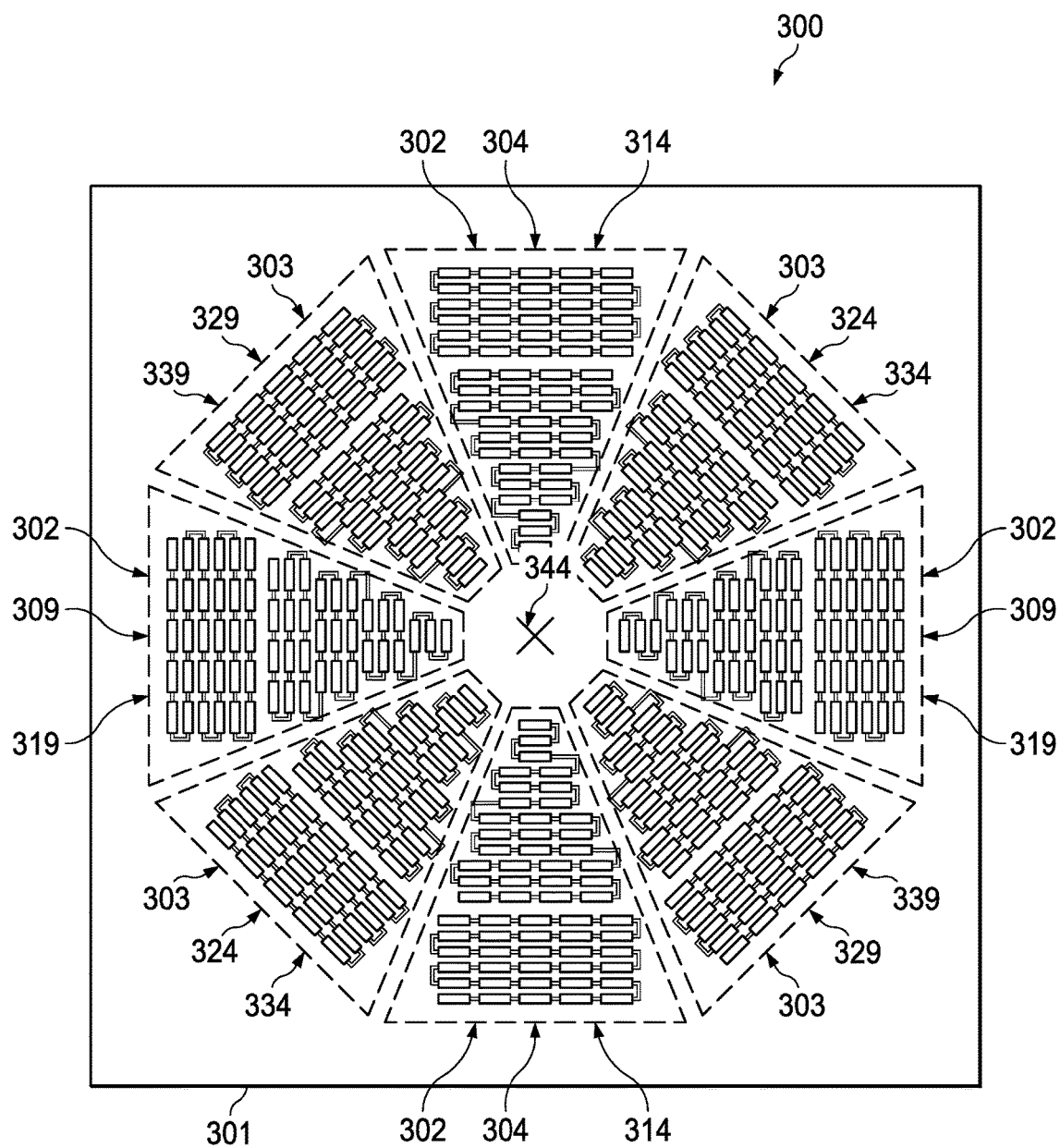
FIG. 3 is a top view of a further example integrated AMR angular sensor.

FIG. 3 is a top view of a further example integrated AMR angular sensor. The integrated AMR angular sensor 300 includes a substrate 301, for example as described in reference to FIG. 1 or FIG. 2. In the instant example, the integrated AMR angular sensor 300 includes a first Wheatstone bridge 302 and a second Wheatstone bridge 303. The first Wheatstone bridge 302 and the second Wheatstone bridge 303 are distributed on the substrate 301 in an octagon arrangement. Key elements of the Wheatstone bridges 302 and 303 are depicted in FIG. 3.

The first Wheatstone bridge 302 includes a first sensor resistor 304, a second sensor resistor 309, a third sensor resistor 314, and a fourth sensor resistor 319. The second Wheatstone bridge 303 includes a fifth sensor resistor 324, a sixth sensor resistor 329, a seventh sensor resistor 334, and an eighth sensor resistor 339.

In the instant example, the first sensor resistor 304 and the third sensor resistor 314 include magnetoresistive segments electrically coupled in series by links and oriented parallel/anti-parallel to each other, as described in reference to FIG. 1 and FIG. 2. The magnetoresistive segments of the first sensor resistor 304 are divided, approximately equally, into a first group and a second group, that are disposed on opposite sides of a central sensor point 344 of the integrated AMR angular sensor 300. A geometric center of the magnetoresistive segments of the first sensor resistor 304 may be located approximately at the central sensor point 344. Similarly, the magnetoresistive segments of the third sensor resistor 314 are divided, approximately equally, into a fifth group and a sixth group, disposed on opposite sides of the central sensor point 344, with a geometric center of the magnetoresistive segments of the third sensor resistor 314 optionally being located approximately at the central sensor point 344. In the instant example, the first sensor resistor 304 and the third sensor resistor 314 occupy two octants of an octagonal area occupied by the eight sensor resistors 304, 309, 314, 319, 324, 329, 334, and 339, as depicted in FIG. 3.

In the instant example, the second sensor resistor 309 and the fourth sensor resistor 319 include magnetoresistive segments electrically coupled in series by links, oriented parallel/anti-parallel to each other and perpendicular to the magnetoresistive segments of the first sensor resistor 304 and the third sensor resistor 314, as described in reference to FIG. 1 and FIG. 2. The magnetoresistive segments of the second sensor resistor 309 are divided, approximately equally, into a third group and a fourth group, that are disposed on opposite sides of the central sensor point 344 of the integrated AMR angular sensor 300. A geometric center of the magnetoresistive segments of the second sensor resistor 309 may be located approximately at the central sensor point 344. Similarly, the magnetoresistive segments of the fourth sensor resistor 319 are divided, approximately equally, into a seventh group and an eighth group, disposed on opposite sides of the central sensor point 344, with a geometric center of the magnetoresistive segments of the fourth sensor resistor 319 optionally being located approximately at the central sensor point 344. In the instant example, the second sensor resistor 309 and the fourth sensor resistor 319 occupy two octants of the octagonal area occupied by the eight sensor resistors 304, 309, 314, 319, 324, 329, 334, and 339, as depicted in FIG. 3.

In the instant example, the fifth sensor resistor 324 and the seventh sensor resistor 334 include magnetoresistive segments electrically coupled in series by links, oriented parallel/anti-parallel to each other, and oriented approximately at a 45 degree angle to the magnetoresistive segments of the first sensor resistor 304 and the third sensor resistor 314, as described in reference to FIG. 1 and FIG. 2. The magnetoresistive segments of the fifth sensor resistor 324 are divided, approximately equally, into a ninth group and a tenth group, that are disposed on opposite sides of the central sensor point 344 of the integrated AMR angular sensor 300. A geometric center of the magnetoresistive segments of the fifth sensor resistor 324 may be located approximately at the central sensor point 344. Similarly, the magnetoresistive segments of the seventh sensor resistor 334 are divided, approximately equally, into a thirteenth group and a fourteenth group, disposed on opposite sides of the central sensor point 344, with a geometric center of the magnetoresistive segments of the seventh sensor resistor 334 optionally being located approximately at the central sensor point 344. In the instant example, the fifth sensor resistor 324 and the seventh sensor resistor 334 occupy two octants of the octagonal area occupied by the eight sensor resistors 304, 309, 314, 319, 324, 329, 334, and 339, as depicted in FIG. 3.

In the instant example, the sixth sensor resistor 329 and the eighth sensor resistor 339 include magnetoresistive segments electrically coupled in series by links, oriented parallel/anti-parallel to each other, oriented perpendicular to the magnetoresistive segments of the fifth sensor resistor 324 and the seventh sensor resistor 334, and oriented approximately at a 45 degree angle to the magnetoresistive segments of the first sensor resistor 304 and the third sensor resistor 314, as described in reference to FIG. 1 and FIG. 2. The magnetoresistive segments of the sixth sensor resistor 329 are divided, approximately equally, into an eleventh group and a twelfth group, that are disposed on opposite sides of the central sensor point 344 of the integrated AMR angular sensor 300. A geometric center of the magnetoresistive segments of the sixth sensor resistor 329 may be located approximately at the central sensor point 344. Similarly, the magnetoresistive segments of the eighth sensor resistor 339 are divided, approximately equally, into a fifteenth group and a sixteenth group, disposed on opposite sides of the central sensor point 344, with a geometric center of the magnetoresistive segments of the eighth sensor resistor 339 optionally being located approximately at the central sensor point 344. In the instant example, the sixth sensor resistor 329 and the eighth sensor resistor 339 occupy two octants of the octagonal area occupied by the eight sensor resistors 304, 309, 314, 319, 324, 329, 334, and 339, as depicted in FIG. 3.

Arranging the eight sensor resistors 304, 309, 314, 319, 324, 329, 334, and 339 symmetrically around the central sensor point 344, as depicted in FIG. 3, may advantageously enable more accurate measurements of angles of non-uniform magnetic fields, compared to other less symmetric configurations. Arranging the eight sensor resistors 304, 309, 314, 319, 324, 329, 334, and 339 to have the geometric centers at approximately the sensor central point 344 may provide the described in reference to FIG. 2.

FIG. 4 is a top view of a portion of an example sensor resistor. The sensor resistor 404 may be representative of any sensor resistors of examples of integrated AMR angular sensors disclosed herein, for example, the sensor resistors 104, 109, 114, 119, 124, 129, 134, and 139 of FIG. 1. The sensor resistor 404 includes a plurality of magnetoresistive segments 405 that are electrically coupled in series by links 406. The magnetoresistive segments 405 include magnetoresistive material, such as an alloy of nickel and iron, for example, manifested in a thin film, optionally containing more than one sub-layer of magnetoresistive material. There may be a sub-layer below the magnetoresistive material, for example, an adhesion layer which may include titanium. There may be a sub-layer over the magnetoresistive material, for example, a cap layer of aluminum nitride to reduce oxidation of the magnetoresistive material.

The links 406 electrically couple adjacent instances of the magnetoresistive segments 405. In the instant example, the links 406 may include metal interconnects 445 located below the magnetoresistive segments 405, combined with vias 446 extending from the metal interconnects 445 to the adjacent instances of the magnetoresistive segments 405. The vias 446 provide a plurality of discrete contact points to the magnetoresistive segments 405. The metal interconnects 445 may be, for example, aluminum interconnects, or damascene copper interconnects. An aluminum interconnect may include an aluminum layer with a few percent silicon, titanium, and/or copper, possibly on an adhesion layer including titanium, and possibly with an anti-reflection layer of titanium nitride on the aluminum layer. A damascene copper interconnect may include copper on a barrier layer of tantalum and/or tantalum nitride, disposed in a trench in a dielectric layer. The vias 446 may include tungsten disposed on a liner of titanium and/or titanium nitride. In the instant example, the vias 446 have substantially equal lateral dimensions, and a plurality of the vias 446 are disposed across each end of the magnetoresistive segments 405 to provide a uniform current density during operation of an integrated AMR angular sensor containing the sensor resistor 404. A configuration of the vias 446 that provides the most uniform current density may have a variable distance between adjacent vias 446, as depicted in FIG. 4.

Each magnetoresistive segment 405 has a length 447 and a width 448. The length 447 is a lateral dimension of the magnetoresistive segment 405 parallel to a direction of current flow in the magnetoresistive segment 405 during operation of the integrated AMR angular sensor. In the instant example, the current flow may extend from a first point of electrical contact to a link 406 at a first end of the magnetoresistive segment 405 to a second point of electrical contact to another link 406 at a second end of the magnetoresistive segment 405. The width 448 extends across the magnetoresistive segment 405 from a first lateral edge 449 of the magnetoresistive segment 405 to a second, opposite, lateral edge 450 of the magnetoresistive segment 405, in a direction perpendicular to the length 447. In cases in which the first lateral edge and second lateral edge are not parallel, the width 448 may be taken as an average width 448 along the length 447. A ratio of the length 447 to the width 448, referred to herein as the length-to-width ratio, is greater than 3 and less than 10.

The links 406 may be configured to provide a uniform current density through the magnetoresistive segments 405 in turn regions 451. Instances of the links 406 in the turn regions 451 may have expanded widths on outer portions 452 to provide a more uniform resistance across the links 406. Other configurations of the links 406 to provide a uniform current density through the magnetoresistive segments 405 are within the scope of the instant example.

FIG. 5 is a top view of a portion of another example sensor resistor. The sensor resistor 504 may be representative of any sensor resistors of examples of integrated AMR angular sensors disclosed herein. The sensor resistor 504 includes a plurality of magnetoresistive segments 505 that are electrically coupled in series by links 506. The magnetoresistive segments 505 include magnetoresistive material. The links 506 electrically couple adjacent instances of the magnetoresistive segments 505. In the instant example, the links 506 may be metal strips located above the magnetoresistive segments 505, and overlapping ends of the magnetoresistive segments 505, making contact to the magnetoresistive material in end regions 553 which extend across the magnetoresistive segments 505.

Each magnetoresistive segment 505 has a length 547 and a width 548. In the instant example, the length 547 is a lateral dimension of the magnetoresistive segment 505 parallel to a direction of current flow through the magnetoresistive segment 505 during operation of the integrated AMR angular sensor, which may extend from the end region 553 at one end of the magnetoresistive segment 505 to the end region 553 at the other end of the magnetoresistive segment 505. The width 548 extends across the magnetoresistive segment 505, for example as described in reference to FIG. 4. A length-to-width ratio is greater than 3 and less than 10.

The links 506 may be configured to provide a uniform current density through the magnetoresistive segments 505 in turn regions 551. Instances of the links 506 in the turn regions 551 may have extended cutouts 554 to provide an extended region for the current to level out before the end regions 553. Other configurations of the links 506 to provide a uniform current density through the magnetoresistive segments 505 are within the scope of the instant example.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. An integrated anisotropic magnetoresistive (AMR) angular sensor, comprising:
    a substrate;
    a first sensor resistor disposed on the substrate, the first sensor resistor comprising a plurality of first magnetoresistive segments electrically coupled in series, wherein:
        the first magnetoresistive segments are divided into a first group and a second group;
        a number of the first magnetoresistive segments in the first group and a number of the first magnetoresistive segments in the second group are equal within 5 percent;
        the first group and the second group are located on opposite sides of a sensor central point of the integrated AMR angular sensor;
        each first magnetoresistive segment has a first length and a first width extending across the first magnetoresistive segment perpendicular to the first length; and
        the first magnetoresistive segments are oriented to have the first lengths parallel/anti-parallel to each other; and
    a second sensor resistor disposed on the substrate, the second sensor resistor comprising a plurality of second magnetoresistive segments electrically coupled in series, wherein:
        the second magnetoresistive segments are divided into a third group and a fourth group;
        a number of the second magnetoresistive segments in the third group and a number of the second magnetoresistive segments in the fourth group are equal within 5 percent;
        the third group and the fourth group are located on opposite sides of the sensor central point;
        each second magnetoresistive segment has a second length and a second width extending across the second magnetoresistive segment perpendicular to the second length; and
        the second magnetoresistive segments are oriented to have the second lengths parallel/anti-parallel to each other, and perpendicular to the first lengths of the first magnetoresistive segments,
        wherein
            a first geometric center of the first magnetoresistive segments is located approximately at the sensor central point; and
            a second geometric center of the second magnetoresistive segments is located approximately at the sensor central point.

2. The integrated AMR angular sensor of claim 1, wherein:
    for each first magnetoresistive segment, a ratio of the first length to the first width is greater than 3 and less than 10; and
    for each second magnetoresistive segment, a ratio of the second length to the second width is greater than 3 and less than 10.

3. The integrated AMR angular sensor of claim 2, wherein:
    the first lengths of the first magnetoresistive segments and the second lengths of the second magnetoresistive segments are all equal; and the ratios of the first lengths to the first widths of the first magnetoresistive segments and the ratios of the second lengths to the second widths of the second magnetoresistive segments are all equal.

4. The integrated AMR angular sensor of claim 1, wherein:
the number of the first magnetoresistive segments in the first group and the number of the first magnetoresistive segments in the second group are equal; and
the number of the second magnetoresistive segments in the third group and the number of the second magnetoresistive segments in the fourth group are equal.

5. The integrated AMR angular sensor of claim 1, comprising first links and second links, wherein:
the first links electrically couple the first magnetoresistive segments in series, wherein each first magnetoresistive segment is contacted by one of the first links at a plurality of discrete contact points; and
the second links electrically couple the second magnetoresistive segments in series, wherein each second magnetoresistive segment is contacted by one of the second links at a plurality of discrete contact points.

6. The integrated AMR angular sensor of claim 1, comprising first links and second links, wherein:
the first links electrically couple the first magnetoresistive segments in series, wherein each first magnetoresistive segment is contacted by a corresponding instance of the first links at a contact region extending across the first magnetoresistive segment; and
the second links electrically couple the second magnetoresistive segments in series, wherein each second magnetoresistive segment is contacted by a corresponding instance of the second links at a contact region extending across the second magnetoresistive segment.

7. The integrated AMR angular sensor of claim 1, comprising first links and second links, wherein:
the first links electrically couple the first magnetoresistive segments in series, wherein an instance of the first links in a first turning region has an extended width in a first outer portion; and
the second links electrically couple the second magnetoresistive segments in series, wherein an instance of the second links in a second turning region has an extended width in a second outer portion.

8. The integrated AMR angular sensor of claim 1, further comprising:
a third sensor resistor disposed on the substrate, the third sensor resistor comprising a plurality of third magnetoresistive segments electrically coupled in series, wherein:
the third magnetoresistive segments are divided into a fifth group and a sixth group;
a number of the third magnetoresistive segments in the fifth group and a number of the third magnetoresistive segments in the sixth group are equal within 5 percent;
the fifth group and the sixth group are located on opposite sides of the sensor central point; and
the third magnetoresistive segments are oriented to have the third lengths parallel/anti-parallel to each other, and parallel/antiparallel to the first lengths of the first magnetoresistive segments; and
a fourth sensor resistor disposed on the substrate, the fourth sensor resistor comprising a plurality of fourth magnetoresistive segments electrically coupled in series, wherein:
the fourth magnetoresistive segments are divided into a seventh group and an eighth group;
a number of the fourth magnetoresistive segments in the seventh group and a number of the fourth magnetoresistive segments in the eighth group are equal within 5 percent;
the seventh group and the eighth group are located on opposite sides of the sensor central point; and
the fourth magnetoresistive segments are oriented to have the fourth lengths parallel/anti-parallel to each other, and perpendicular to the first lengths of the first magnetoresistive segments;
wherein the first sensor resistor, the second sensor resistor, the third sensor resistor, and the fourth sensor resistor are components of a Wheatstone bridge of the integrated AMR angular sensor.

9. An integrated AMR angular sensor, comprising:
a substrate;
a first Wheatstone bridge, comprising:
a first sensor resistor disposed on the substrate, the first sensor resistor comprising a plurality of first magnetoresistive segments electrically coupled in series, wherein:
the first magnetoresistive segments are divided into a first group and a second group;
a number of the first magnetoresistive segments in the first group and a number of the first magnetoresistive segments in the second group are equal within 5 percent;
the first group and the second group are located on opposite sides of a sensor central point of the integrated AMR angular sensor;
each first magnetoresistive segment has a first length and a first width extending across the first magnetoresistive segment perpendicular to the first length; and
the first magnetoresistive segments are oriented to have the first lengths parallel/anti-parallel to each other; and
a second sensor resistor disposed on the substrate, the second sensor resistor comprising a plurality of second magnetoresistive segments electrically coupled in series, wherein:
the second magnetoresistive segments are divided into a third group and a fourth group;
a number of the second magnetoresistive segments in the third group and a number of the second magnetoresistive segments in the fourth group are equal within 5 percent;
the third group and the fourth group are located on opposite sides of the sensor central point;
each second magnetoresistive segment has a second length and a second width extending across the second magnetoresistive segment perpendicular to the second length; and
the second magnetoresistive segments are oriented to have the second lengths parallel/anti-parallel to each other, and perpendicular to the first lengths of the first magnetoresistive segments;
a third sensor resistor disposed on the substrate, the third sensor resistor comprising a plurality of third magnetoresistive segments electrically coupled in series, wherein:
the third magnetoresistive segments are divided into a fifth group and a sixth group;

a number of the third magnetoresistive segments in the fifth group and a number of the third magnetoresistive segments in the sixth group are equal within 5 percent;

the fifth group and the sixth group are located on opposite sides of the sensor central point;

each third magnetoresistive segment has a third length and a third width extending across the third magnetoresistive segment perpendicular to the third length; and the third magnetoresistive segments are oriented to have the third lengths parallel/anti-parallel to each other, and parallel/antiparallel to the first lengths of the first magnetoresistive segments; and a fourth sensor resistor disposed on the substrate, the fourth sensor resistor comprising a plurality of fourth magnetoresistive segments electrically coupled in series, wherein:

the fourth magnetoresistive segments are divided into a seventh group and an eighth group;

a number of the fourth magnetoresistive segments in the seventh group and a number of the fourth magnetoresistive segments in the eighth group are equal within 5 percent;

the seventh group and the eighth group are located on opposite sides of the sensor central point;

each fourth magnetoresistive segment has a fourth length and a fourth width extending across the fourth magnetoresistive segment perpendicular to the fourth length; and the fourth magnetoresistive segments are oriented to have the fourth lengths parallel/anti-parallel to each other, and perpendicular to the first lengths of the first magnetoresistive segments; and a second Wheatstone bridge, comprising:

a fifth sensor resistor disposed on the substrate, the fifth sensor resistor comprising a plurality of fifth magnetoresistive segments electrically coupled in series, wherein:

the fifth magnetoresistive segments are divided into a ninth group and a tenth group;

a number of the fifth magnetoresistive segments in the ninth group and a number of the fifth magnetoresistive segments in the tenth group are equal within 5 percent;

the ninth group and the tenth group are located on opposite sides of the sensor central point;

each fifth magnetoresistive segment has a fifth length and a fifth width extending across the fifth magnetoresistive segment perpendicular to the fifth length; and the fifth magnetoresistive segments are oriented to have the fifth lengths parallel/anti-parallel to each other, and at a 45 degree angle to the first lengths of the first magnetoresistive segments; and a sixth sensor resistor disposed on the substrate, the sixth sensor resistor comprising a plurality of sixth magnetoresistive segments electrically coupled in series, wherein:

the sixth magnetoresistive segments are divided into an eleventh group and a twelfth group;

a number of the sixth magnetoresistive segments in the eleventh group and a number of the sixth magnetoresistive segments in the twelfth group are equal within 5 percent;

the eleventh group and the twelfth group are located on opposite sides of the sensor central point;

each sixth magnetoresistive segment has a sixth length and a sixth width extending across the sixth magnetoresistive segment perpendicular to the sixth length; and the sixth magnetoresistive segments are oriented to have the sixth lengths parallel/anti-parallel to each other, perpendicular to the fifth lengths of the fifth magnetoresistive segments, and at a 45 degree angle to the first lengths of the first magnetoresistive segments;

a seventh sensor resistor disposed on the substrate, the seventh sensor resistor comprising a plurality of seventh magnetoresistive segments electrically coupled in series, wherein:

the seventh magnetoresistive segments are divided into a thirteenth group and a fourteenth group;

a number of the seventh magnetoresistive segments in the thirteenth group and a number of the seventh magnetoresistive segments in the fourteenth group are equal within 5 percent;

the thirteenth group and the fourteenth group are located on opposite sides of the sensor central point;

each seventh magnetoresistive segment has a seventh length and a seventh width extending across the seventh magnetoresistive segment perpendicular to the seventh length; and the seventh magnetoresistive segments are oriented to have the seventh lengths parallel/anti-parallel to each other, parallel/anti-parallel to the fifth lengths of the fifth magnetoresistive segments, and at a 45 degree angle to the first lengths of the first magnetoresistive segments; and an eighth sensor resistor disposed on the substrate, the eighth sensor resistor comprising a plurality of eighth magnetoresistive segments electrically coupled in series, wherein:

the eighth magnetoresistive segments are divided into a fifteenth group and a sixteenth group;

a number of the eighth magnetoresistive segments in the fifteenth group and a number of the eighth magnetoresistive segments in the sixteenth group are equal within 5 percent;

the fifteenth group and the sixteenth group are located on opposite sides of the sensor central point;

each eighth magnetoresistive segment has an eighth length and an eighth width extending across the eighth magnetoresistive segment perpendicular to the eighth length; and the eighth magnetoresistive segments are oriented to have the eighth lengths parallel/anti-parallel to each other, perpendicular to the fifth lengths of the fifth magnetoresistive segments, and at a 45 degree angle to the first lengths of the first magnetoresistive segments.

10. The integrated AMR angular sensor of claim 9, wherein:

for each first magnetoresistive segment, a ratio of the first length to the first width is greater than 3 and less than 10;

for each second magnetoresistive segment, a ratio of the second length to the second width is greater than 3 and less than 10;

for each third magnetoresistive segment, a ratio of the third length to the third width is greater than 3 and less than 10;

for each fourth magnetoresistive segment, a ratio of the fourth length to the fourth width is greater than 3 and less than 10;

for each fifth magnetoresistive segment, a ratio of the fifth length to the fifth width is greater than 3 and less than 10;

for each sixth magnetoresistive segment, a ratio of the sixth length to the sixth width is greater than 3 and less than 10;

for each seventh magnetoresistive segment, a ratio of the seventh length to the seventh width is greater than 3 and less than 10; and for each eighth magnetoresistive segment, a ratio of the eighth length to the eighth width is greater than 3 and less than 10.

11. The integrated AMR angular sensor of claim 10, wherein:

the first lengths of the first magnetoresistive segments, the second lengths of the second magnetoresistive segments, the third lengths of the third magnetoresistive segments, the fourth lengths of the fourth magnetoresistive segments, the fifth lengths of the fifth magnetoresistive segments, the sixth lengths of the sixth magnetoresistive segments, the seventh lengths of the seventh magnetoresistive segments, and the eighth lengths of the eighth magnetoresistive segments are all equal; and the ratios of the first lengths to the first widths of the first magnetoresistive segments, the ratios of the second lengths to the second widths of the second magnetoresistive segments, the ratios of the third lengths to the third widths of the third magnetoresistive segments, the ratios of the fourth lengths to the fourth widths of the fourth magnetoresistive segments, the ratios of the fifth lengths to the fifth widths of the fifth magnetoresistive segments, the ratios of the sixth lengths to the sixth widths of the sixth magnetoresistive segments, the ratios of the seventh lengths to the seventh widths of the seventh magnetoresistive segments, and the ratios of the eighth lengths to the eighth widths of the eighth magnetoresistive segments are all equal.

12. The integrated AMR angular sensor of claim 9, wherein:

the number of the first magnetoresistive segments in the first group and the number of the first magnetoresistive segments in the second group are equal;

the number of the second magnetoresistive segments in the third group and the number of the second magnetoresistive segments in the fourth group are equal;

the number of the third magnetoresistive segments in the fifth group and the number of the third magnetoresistive segments in the sixth group are equal;

the number of the fourth magnetoresistive segments in the seventh group and the number of the fourth magnetoresistive segments in the eighth group are equal;

the number of the fifth magnetoresistive segments in the ninth group and the number of the fifth magnetoresistive segments in the tenth group are equal;

the number of the sixth magnetoresistive segments in the eleventh group and the number of the sixth magnetoresistive segments in the twelfth group are equal;

the number of the seventh magnetoresistive segments in the thirteenth group and the number of the seventh magnetoresistive segments in the fourteenth group are equal; and the number of the eighth magnetoresistive segments in the fifteenth group and the number of the eighth magnetoresistive segments in the sixteenth group are equal.

13. The integrated AMR angular sensor of claim 9, comprising links, wherein the links electrically couple the first magnetoresistive segments in series, electrically couple the second magnetoresistive segments in series, electrically couple the third magnetoresistive segments in series, electrically couple the fourth magnetoresistive segments in series, electrically couple the fifth magnetoresistive segments in series, electrically couple the sixth magnetoresistive segments in series, electrically couple the seventh magnetoresistive segments in series, and electrically couple the eighth magnetoresistive segments in series; and wherein each first magnetoresistive segment, each second magnetoresistive segment, each third magnetoresistive segment, each fourth magnetoresistive segment, each fifth magnetoresistive segment, each sixth magnetoresistive segment, each seventh magnetoresistive segment, and each eighth magnetoresistive segment is contacted by one of the links at a plurality of discrete contact points.

14. The integrated AMR angular sensor of claim 9, comprising links, wherein the links electrically couple the first magnetoresistive segments in series, electrically couple the second magnetoresistive segments in series, electrically couple the third magnetoresistive segments in series, electrically couple the fourth magnetoresistive segments in series, electrically couple the fifth magnetoresistive segments in series, electrically couple the sixth magnetoresistive segments in series, electrically couple the seventh magnetoresistive segments in series, and electrically couple the eighth magnetoresistive segments in series; wherein:

each first magnetoresistive segment is contacted by one of the links at an extended contact region extending across the first magnetoresistive segment;

each second magnetoresistive segment is contacted by one of the links at an extended contact region extending across the second magnetoresistive segment;

each third magnetoresistive segment is contacted by one of the links at an extended contact region extending across the third magnetoresistive segment;

each fourth magnetoresistive segment is contacted by one of the links at an extended contact region extending across the fourth magnetoresistive segment;

each fifth magnetoresistive segment is contacted by one of the links at an extended contact region extending across the fifth magnetoresistive segment;

each sixth magnetoresistive segment is contacted by one of the links at an extended contact region extending across the sixth magnetoresistive segment;

each seventh magnetoresistive segment is contacted by one of the links at an extended contact region extending across the seventh magnetoresistive segment; and each eighth magnetoresistive segment is contacted by one of the links at an extended contact region extending across the seventh magnetoresistive segment.

15. The integrated AMR angular sensor of claim 9, comprising links, wherein the links electrically couple the first magnetoresistive segments in series, electrically couple the second magnetoresistive segments in series, electrically couple the third magnetoresistive segments in series, electrically couple the fourth magnetoresistive segments in series, electrically couple the fifth magnetoresistive segments in series, electrically couple the sixth magnetoresistive segments in series, electrically couple the seventh magnetoresistive segments in series, and electrically couple the eighth magnetoresistive segments in series; wherein an instance of the links in a first turning region has an extended width in a first outer portion.

16. The integrated AMR angular sensor of claim 9, wherein:
    a first geometric center of the first magnetoresistive segments is located approximately at the sensor central point;
    a second geometric center of the second magnetoresistive segments is located approximately at the sensor central point;
    a third geometric center of the third magnetoresistive segments is located approximately at the sensor central point;
    a fourth geometric center of the fourth magnetoresistive segments is located approximately at the sensor central point;
    a fifth geometric center of the fifth magnetoresistive segments is located approximately at the sensor central point;
    a sixth geometric center of the sixth magnetoresistive segments is located approximately at the sensor central point;
    a seventh geometric center of the seventh magnetoresistive segments is located approximately at the sensor central point; and
    an eighth geometric center of the eighth magnetoresistive segments is located approximately at the sensor central point.

17. The integrated AMR angular sensor of claim 9, wherein the first magnetoresistive segments, the second magnetoresistive segments, the third magnetoresistive segments, the fourth magnetoresistive segments, the fifth magnetoresistive segments, the sixth magnetoresistive segments, the seventh magnetoresistive segments, and the eighth magnetoresistive segments occupy an area that is substantially square.

18. The integrated AMR angular sensor of claim 9, wherein the first magnetoresistive segments, the second magnetoresistive segments, the third magnetoresistive segments, the fourth magnetoresistive segments, the fifth magnetoresistive segments, the sixth magnetoresistive segments, the seventh magnetoresistive segments, and the eighth magnetoresistive segments occupy an octagonal area; wherein:
    the first magnetoresistive segments and the third magnetoresistive segments occupy two octants of the octagonal area;
    the second magnetoresistive segments and the fourth magnetoresistive segments occupy two octants of the octagonal area;
    the fifth magnetoresistive segments and the seventh magnetoresistive segments occupy two octants of the octagonal area; and
    the sixth magnetoresistive segments and the eighth magnetoresistive segments occupy two octants of the octagonal area.

19. An integrated AMR angular sensor, comprising:
    a substrate; and
    a Wheatstone bridge, comprising:
        a first sensor resistor disposed on the substrate and comprising a plurality of first magnetoresistive segments having length-to-width ratios greater than 3 and less than 10, wherein a first geometric center of the first magnetoresistive segments is located approximately at a sensor central point of the integrated AMR angular sensor;
        a second sensor resistor disposed on the substrate and comprising a plurality of second magnetoresistive segments having length-to-width ratios greater than 3 and less than 10, wherein a second geometric center of the second magnetoresistive segments is located approximately at the sensor central point;
        a third sensor resistor disposed on the substrate and comprising a plurality of third magnetoresistive segments having length-to-width ratios greater than 3 and less than 10, wherein a third geometric center of the third magnetoresistive segments is located approximately at the sensor central point; and
        a fourth sensor resistor disposed on the substrate and comprising a plurality of fourth magnetoresistive segments having length-to-width ratios greater than 3 and less than 10, wherein a fourth geometric center of the fourth magnetoresistive segments is located approximately at the sensor central point.

* * * * *